United States Patent
Garcia et al.

(10) Patent No.: US 10,308,558 B2
(45) Date of Patent: Jun. 4, 2019

(54) PROCESS OF MANUFACTURING CEMENTED CARBIDE AND A PRODUCT OBTAINED THEREOF

(71) Applicant: SANDVIK INTELLECTUAL PROPERTY AB, Sandviken (SE)

(72) Inventors: Jose Garcia, Enskededalen (SE); Susanne Norgren, Huddinge (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 31 days.

(21) Appl. No.: 14/894,276

(22) PCT Filed: May 28, 2014

(86) PCT No.: PCT/EP2014/061151
§ 371 (c)(1),
(2) Date: Nov. 25, 2015

(87) PCT Pub. No.: WO2014/191505
PCT Pub. Date: Dec. 4, 2014

(65) Prior Publication Data
US 2016/0122250 A1 May 5, 2016

(30) Foreign Application Priority Data

May 31, 2013 (EP) .................................. 13170068

(51) Int. Cl.
*C04B 35/56* (2006.01)
*C22C 29/02* (2006.01)
*B22F 9/04* (2006.01)
*C22C 29/00* (2006.01)
*B22F 5/00* (2006.01)
*C22C 29/08* (2006.01)

(52) U.S. Cl.
CPC ............ *C04B 35/5626* (2013.01); *B22F 9/04* (2013.01); *C22C 29/005* (2013.01); *C22C 29/02* (2013.01); *B22F 2005/001* (2013.01); *B22F 2009/041* (2013.01); *B22F 2201/02* (2013.01); *B22F 2201/20* (2013.01); *B22F 2302/10* (2013.01); *C22C 29/08* (2013.01)

(58) Field of Classification Search
CPC ... C04B 35/5626; C22C 29/02; C22C 29/005; B22F 9/04; B22F 2005/001
See application file for complete search history.

(56) References Cited

U.S. PATENT DOCUMENTS

| 4,277,283 A | 7/1981 | Tobioka et al. | |
| 5,729,823 A * | 3/1998 | Gustafson | C22C 29/02 419/11 |
| 6,344,264 B1 * | 2/2002 | Lenander | C22C 29/08 428/216 |
| 2002/0112896 A1* | 8/2002 | Kruse | C23C 30/005 175/426 |
| 2004/0009088 A1* | 1/2004 | Glatzle | B22F 7/02 419/14 |
| 2004/0079191 A1* | 4/2004 | Kobayashi | C22C 29/02 75/242 |
| 2004/0187638 A1* | 9/2004 | Heinrich | C22C 29/067 75/240 |
| 2005/0025657 A1* | 2/2005 | Gustafson | C22C 1/051 419/57 |
| 2005/0224958 A1 | 10/2005 | Kassel et al. | |
| 2009/0180916 A1 | 7/2009 | Norgren | |
| 2009/0242824 A1* | 10/2009 | Akesson | C22C 29/08 252/62.51 R |

FOREIGN PATENT DOCUMENTS

| CN | 1497053 A | 5/2004 |
| CN | 102159743 A | 8/2011 |
| JP | S5484812 A | 7/1979 |
| JP | S5487616 A | 7/1979 |
| JP | 2012162753 A | 8/2012 |
| WO | 2012145773 A1 | 11/2012 |
| WO | 2014191511 A1 | 12/2014 |

OTHER PUBLICATIONS

Reichel B et al: "Alloyed W—(Co, Ni, Fe)—C phases for reaction sintering of hardmetals", International Journal of Refractory Metals and Hard Materials, Elsevier Publishers, Barking, GB, vol. 28, No. 5. Sep. 1, 2010, pp. 638-645.

* cited by examiner

*Primary Examiner* — Jessee R Roe
(74) *Attorney, Agent, or Firm* — Corinne R. Gorski

(57) ABSTRACT

A process of manufacturing cemented carbide and to a product obtained thereof, wherein hex doped WC is subjected to nitrogen before and/or during sintering.

15 Claims, 3 Drawing Sheets

Example 1 (state-of-art)

Example 2 (manufactured according to the invention)

A schematic illustration of the process as defined hereinabove or hereinafter

Atom probe measurement - Each dot represents a Ta atom.

PROCESS OF MANUFACTURING CEMENTED CARBIDE AND A PRODUCT OBTAINED THEREOF

RELATED APPLICATION DATA

This application is a § 371 National Stage Application of PCT International Application No. PCT/EP2014/061151 filed May 28, 2014 claiming priority of EP Application No. 13170068.4, filed May 31, 2013.

TECHNICAL FIELD

The present relates to a process of manufacturing cemented carbide and to a product obtained thereof.

BACKGROUND

Cemented carbide is used for manufacturing sintered bodies for e.g. cutting tools, wear parts, rock drill bits, etc. The cemented carbide industry is also interested in producing materials that are hard and have wear resistant to be used at high speed conditions. This is achieved by coating cemented carbides with layers of e.g. TiN, Ti(C, N), (Ti, Al)N and/or $Al_2O_3$.

In U.S. Pat. No. 4,277,283, the cemented carbides are sintered so that a gradient is formed, thus a surface zone is created which is cobalt enriched and free from gamma phase. This is usually performed by incorporating carbonitrides as raw materials.

WO 2012/145773 relates to a tungsten monocarbide powder formed of a hexagonal tungsten carbide doped with at least one group 4 and/or group 5 and/or group 7 transition metal (excluding Tc). The document also discloses a two-stage method for producing novel doped hexagonal tungsten carbides via $(W, Me)_2C$ to $(W, Me)C$.

Reichel, B et al (International Journal of Refractory Metals and Hard Materials 28 (2010) 638-645) discloses a method for the production of doped hard metals with individual carbides. According to the method, double or triple alloyed sub-carbides of the type $Me_xCo_yC_z$ (wherein Me=metal such as W, V, Cr, Ta, Ti etc) are used as starting materials to produce hardmetals containing WC or WC/cubic carbide phase embedded in a Co binder phase. However, this method has problems with adjusting the carbon content to produce defect free structures (such as eta-phase or free-graphite) since extra carbon need to be added to the starting $Me_xCo_yC_z$ subcarbides to produce the final desired microstructure. Furthermore, it has never been proved that by using the method described a sintered hardmetal containing hex WC doped with any cubic carbide can be produced.

When using hex-doped WC, the main challenge from a processing point of view, is to avoid the precipitation of the doping transition metal in the form of a carbide or carbonitride out of the hex-doped WC phase during the sintering process and none of the methods disclosed above solves this problem. Additionally, for certain applications of cemented carbides, there is also a challenge to avoid precipitation of cubic carbides as these will reduce the toughness of the obtained sintered product.

Thus, the process and the product obtained thereby disclosed in the present disclosure will migrate and/or provide a solution to the problems mentioned above.

SUMMARY OF THE INVENTION

Hence, the present disclosure provides a process of manufacturing a cemented carbide, said process comprises the steps of:

a) forming a slurry comprising a milling liquid, binder metal and hard constituents, wherein the hard constituents comprise hex doped WC;
b) subjecting said slurry to milling and drying;
c) subjecting the powder mixture obtained from b) to pressing and sintering;
wherein the hex doped WC is subjected to nitrogen before and/or during sintering. It has surprisingly been found that by subjecting the hex doped WC to nitrogen before and/or during the sintering process, the above-mentioned problems will be solved or migrated. Without being bound to any theory, it is believed that the nitrogen has an effect on the solubility of the doping elements in the hexagonal WC. Thus, by applying the process as defined hereinabove or hereinafter, the precipitation of the doping out of the hex doped WC is controlled. Furthermore, by applying said process, a gradient cemented carbide containing hex doped WC grains will be obtained.

The present process as defined hereinabove or hereinafter therefore provides a possibility and an opportunity to tailor the thickness of the gradient by combining the present process and the doping level of the hexagonal WC. Additionally, the present process as defined hereinabove or hereinafter provides for a reduced volume fraction of the gamma-phase in the sintered product as a certain content of the transition metal elements forming the gamma-phase will remain as solid solution in the hex doped WC.

The present disclosure also relates to the use of a process of manufacturing of a cemented carbide as defined hereinabove or hereinafter for making a cutting tool.

Additionally, the present disclosure provides a cemented carbide obtainable according to the process as defined hereinabove or hereinafter. Furthermore, the present disclosure provides a cutting tool obtainable according to the process as defined hereinabove or hereinafter. The cemented carbide and thereby the cutting tool encompasse enhanced hardness-to-toughness ratio compared to conventional cemented carbides as the hardness of the hexdoped WC is reduced and the obtained cemented carbide and thereby the cutting tool can, due to this enhanced hardness-to-toughness, comprise less binder metal, such as Cr, Mo, Fe, Co and/or Ni, and still encompass the desired properties.

DEFINITIONS

Figure 1A:
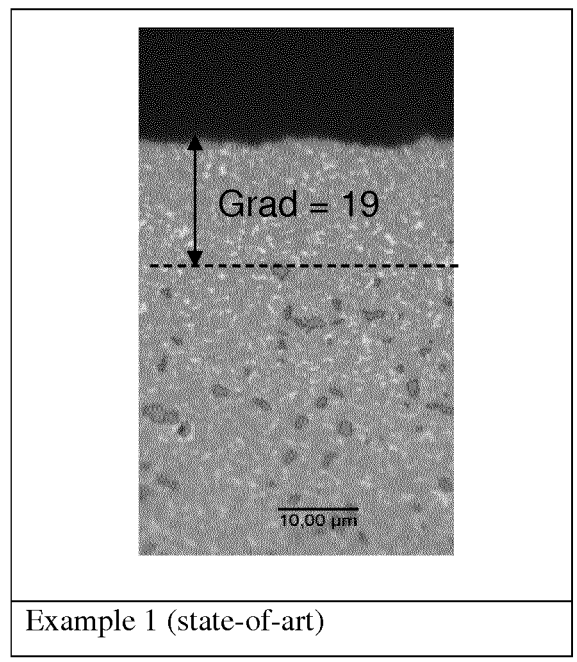
FIG. 1A discloses a cemented carbide obtained according to a state of the art process.

As used herein unless stated otherwise, the terms "doped WC", "hex doped WC" and "hexagonal doped WC", as used interchangeably, are intended to mean that the tungsten atoms within the hexagonal crystal structure of the tungsten carbide are partly replaced with atoms of the transition metal(s) selected from element group 4 and/or element group 5 and/or element group 7 (transition metals), excluding Tc. Examples of, but not limited to, transition metal are Ta, Ti, V, Cr and Nb. Hex doped WC may also be written as hex(Me, W)(C) or hex(Me, W)(C, N), wherein Me is any of the transition metals disclosed above.

The terms "hex WC" and "hexagonal WC", as used interchangeably herein, are intended to mean a tungsten carbide having a hexagonal structure.

As used herein, the term "gradient" is intended to mean a surface region is free of gamma phase, thus the surface region will be enriched with the binder metal. However, even though a gradient is said to be free of gamma-phase, there may, depending on the process parameters, be isolated gamma-phase precipitate inside the gradient (thus in these cases the gamma-phase may be said to be essentially free of gamma phase). The thickness of gradient may be in the range of from 2 and 50 µm, such as of from 15 and 25 µm.

As used herein unless stated otherwise, the term "hard constituents" is intended to include WC, hex doped WC, and also carbides, nitrides, carbonitrides, borides, carboxides, carboxynitrides and mixtures thereof of the elements corresponding to the element groups 4, 5 and 6 of the periodic table. Examples of carbides, nitrides, carbonitrides, borides, carboxides, carboxynitrides and mixtures thereof of the elements corresponding to the element groups 4, 5 and 6 of the periodic table, but not limited to, are TiC, TaC, TiN, $Cr_3C_2$, NbC and $TiB_2$. The hard constituents are, when they are dry, in the form of powder.

According to the present disclosure, the term "cutting tool" is used for any tool that is used to remove material from a work piece by means of shear deformation, examples of, but not limiting to, cutting tools are inserts, end mills, mining tool, bits and drills.

Additionally, the term "sintered body" is, unless stated otherwise, intended to include cutting tool.

By the term "gamma phase" is herein meant the cubic phase formed during sintering. Depending on the overall composition of the cemented carbide, the gamma phase is usually described as $(W, Me_1, Me_2 \ldots)(C, N, O, B)$, wherein $Me_x$ is Ti, Zr, Hf, V, Ta, Nb, Cr, Mo, W, Mn, Re, Ru, Fe, Co, Ni and Al and the phase has a cubic structure. In order to form the gamma phase, a certain amount of cubic carbides needs to be present. The most common cubic carbides used for creating the gamma phase are TiC, TaC and NbC, however, cubic carbides of other elements can also be used.

DETAILED DESCRIPTION OF THE INVENTION

The present invention relates to a process of manufacturing a cemented carbide, said process comprises the steps of:
a) forming a slurry comprising a milling liquid, binder metal and hard constituents, wherein said hard constituents comprise hex doped WC;
b) subjecting the slurry obtained from step a) to milling and drying;
c) subjecting the powder mixture obtained from b) to pressing and sintering;
wherein the hex doped WC is subjected to nitrogen before and/or during sintering. The sintering may be performed in a temperature range of from 500-1500° C. with a nitrogen pressure in the range of from 1 mbar and 200 bar. The sintering process also comprises a sintering step under vacuum atmosphere. The sintering may be a liquid phase sintering. Hence, the present disclosure relates to a process of producing gradient cemented carbides comprising hex doped WC. The hexagonal WC has been doped with doping elements selected from the element groups 4, 5 and/or 7 (excluding Tc). Examples of such elements are Ta, Nb, Ti, V, Cr and mixtures thereof.

During the vacuum sintering step, a gamma-phase free surface zone (gradient) is formed mainly due to the dissolution of a transition metal nitride or transition metal carbonitride, such as those selected from the group of TiN, TaN, NbN, ZrN, VN, HfN, Ti(C, N), Ta(C, N) and mixture thereof, preferably TiN and/or TaN, in the binder metal. This dissolution promots out-diffusion of nitrogen and due to the thermodynamic coupling of said transition metal, which has high affinity to N, an inward diffusion of said transition metal occurs. Transition metals having affinity to nitrogen, such as Ti, Nb and Ta, follow the same process. The diffusion-controlled process leads to the formation of a gamma-phase gradient after a certain time at solid or liquid phase sintering conditions. However, if the transition metal used will not form a gradient during sintering, then a transition metal having affinity for nitrogen is added. These transition metals (having an affinity for nitrogen) are preferably selected from Ti, V, Zr and/or Ta, these metals may be added in the form of nitrides, e.g. TiN and TaN or as carbonitrides, e.g. Ti(C, N). Most preferably, the nitrides and carbonitrides having transition metals (having an affinity for nitrogen) are selected from nitrides and carbonitrides of Ti, V and Ta and mixtures thereof.

In order to form a hexagonal structure of the doped WC, the amount of doped element needs to be restricted. If the amount of doped element exceeds the maximum solid solubility in the hex WC, the WC will form a cubic carbide phase of the type (W, Me)C, where Me is the doping element, e.g. $(W_{0.5}, Ti_{0.5})C$, which is not desirable. The exact amount of doped element that may be added is somewhat dependent on the specific doping element of choice but the amount of doped element should not exceed 3 wt % of the total weight of the hex doped WC.

According to one embodiment of the present invention, the hard constituents used in the process as defined hereinabove or hereinafter are selected from hex doped WC, WC, TiC, TaC, NbC, $Cr_3C_2$ and mixtures thereof. According to one embodiment of the present invention, the hard constituents used in the process as defined hereinabove or hereinafter are selected from hex doped WC, WC, Ti(C, N) Ta(C, N), NbC, $Cr_3C_2$ and mixtures thereof. According to another embodiment of the present invention, said hard constituents are selected from hex doped WC, WC, TiC, TaC, $Cr_3C_2$ and mixtures thereof. According to yet another embodiment of the present invention, the amount of WC comprised hard constituents does only consist of hex doped WC. According to a further embodiment of the present invention, said hard constituents are hex doped WC and one or more of TaC and TiC.

According to one embodiment of the present disclosure, the powder fractions, i.e. the hard constituents and the binder metal and any other optionally added powder, may be added in the following amounts: WC and hexdoped WC in the range of from 65 to 90 wt %, such as 70 to 90 wt %; binder metal, such as Co, in the range of from 3 to 15 wt %, such as 5 to 9 wt %; Ta (Ta may be in the form of TaC or TaN or Ta(C, N) or mixtures thereof in the hex doped WC) in the range of from 1 to 5 wt %, such as 1 to 3 wt %; Ti (Ti may be in the form of TiC or TiN or Ti(C, N) or mixtures thereof in the hex doped WC) in the range of from 0.5 to 5 wt %, such as 0.5 to 3 wt %.

According to the present disclosure, in the process of manufacturing a cemented carbide as defined hereinabove or hereinafter, the hex doped WC is subjected to nitrogen by the addition of a transition metal nitride or a transition metal carbonitride to the slurry obtained from step a) before step b) is performed. Said transition metal nitride may be selected from NbN, ZrN, HfN, VN, TiN, TaN and mixtures thereof, such as TiN and/or TaN. The nitrides are added as a powder to the slurry. Also, transition metal carbonitrides may be used for adding the nitrogen, examples of such elements are Ti(C, N) and Ta(C, N). Also, said transition metal nitide or transition metal carbonitride may be selected from TiN, Ti(C, N), V(C, N), Zr (C, N), TaN, NbN, Ta(C, N) and mixtures thereof.

According to the present disclosure, in the process of manufacturing a cemented carbide as defined hereinabove or hereinafter, the hex doped WC is subjected to nitrogen gas before sintering. It is also possible to combine this subjection with the addition of a transition metal nitride to slurry obtained from step a).

Also, according to the process of manufacturing a cemented carbide as defined hereinabove or hereinafter, the doped WC may be subjected to nitrogen gas during sintering. This may be combined with either the subjection to nitrogen gas before the sintering or with the addition of transition metal nitride to the slurry obtained from step a). It is also possible that the process as defined hereinabove or hereinafter may comprise all these subjections, i.e. the addition of transition metal nitride or transition metal carbonitride to the slurry, the subjection of the doped WC to nitrogen gas both before and during sintering.

Additionally, according to the process of manufacturing a cemented carbide as defined hereinabove or hereinafter, one step of the sintering process may be performed under vacuum. According to one preferred embodiment of the present disclosure, one step of the sintering process is performed under vaccum and the sintering process is liquid phase sintering.

Further, according to the present invention and in relation to what has been written above regarding the nitrogen subjection, it is also possible to subject the hex doped WC nitrogen during the manufacture of the hex doped WC. Said hex doped WC, (W, Me, . . . )(C, N) or (W, Me, . . . )C, may thereafter be used in the process as described hereinabove or hereinafter.

According to one embodiment of the present disclosure, the hex doped WC is doped with a transition metal selected from Ta, Ti, Nb, V, Cr and mixtures thereof, preferably the transition metal is Ta and/or Ti. The process used for doping WC is described in WO 2012/145773.

The average grain size of the hex doped WC when added to the slurry is in the range of from 0.4 to 12 µm, such as of from 2 to 8 µm. The grain size of the cubic carbides, e.g. TiC, is usually in the range of from 0.8 and 2.5 µm.

The binder metal can either be a powder of one single binder metal or a powder blend of two or more metals or a powder of an alloy of two or more metals. The binder metals are selected from the group consisting of Cr, Mo, Fe, Co, Ni and mixtures thereof, preferably from Co, Fe or Ni and mixtures thereof, most preferably Co. The grain size of the added binder metal is in the range of from 0.5 to 3 µm, preferably from 0.5 to 1.5 µm. The amount of binder metal added separately is dependent on the content of the hard constituent as defined hereinabove or hereinafter. Hence, the amount of binder metal added is the amount required to achieve the aimed binder metal content in the final product. The total binder metal content in the final product is in the range of from 2 to 15 wt %.

The hard constituents as defined hereinabove or hereinafter, the binder metal and an organic binder are mixed by a milling operation, either in a ball mill, attritor mill or pearl mill. The milling is performed by first forming a slurry comprising the binder metal, said hard constituents and the organic binder. The milling time varies, as it is dependent on both the type of mill used and on the quality of the powders to be milled and on the desired grain size. Suitable milling times are from between 10 to 120 h for a ball mill or from between 10 to 35 h for an attritor mill. The slurry is then milled to obtain a homogenous slurry blend. The milling is performed in order to de-agglomerate and to reduce the powder grain size. Milling bodies may be used. Also, a lubricant may be added in order to improve the strength of the green body. Any liquid commonly used as a milling liquid in conventional cemented carbide manufacturing processes may be used, for example water, alcohol, organic solvents or mixture thereof.

An organic binder is added to the slurry in order to facilitate the granulation during the following the drying operation, such as spray drying or pan-drying, but will also function as a pressing agent for any of the following pressing and/or sintering operations. The organic binder may be any binder commonly used in the art, such as paraffin, polyethylene glycol (PEG), long chain fatty acids and mixture thereof. The amount of organic binder used is in the range of from 15 and 25 vol % based on the total dry powder volume, the amount of organic binder is not included in the total dry powder volume. According to the present disclosure, recycled WC also called PRZ or recycled cemented carbide scrap is added to the slurry before step b) in an amount up to or equal to 50 wt %. The amount added will depend, as known to the skilled person, on the composition of the scrap and on the desired composition of the final cemented carbide. PRZ comprises the elements W, C, Co, and at least one or more of Ta, Ti, Nb, Cr, Zr, Hf and Mo. The recycling process is usually performed by either metallurgical or chemical means, such as by the zinc recovering process, electrolytic recovery and, extraction or oxidation, which are all known to the skilled person.

Figure 2:
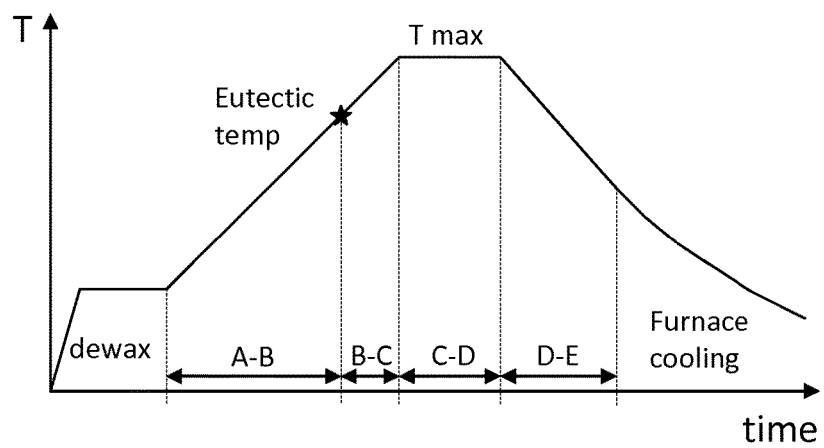
FIG. 2 discloses a schematic figure of the process as defined hereinabove or hereinafter.

Green bodies are subsequently formed from the dried powders/granules by a pressing operation such as uniaxial pressing, multiaxial pressing etc. The green bodies formed from the dried powders/granules is subsequently sintered according to known sintering methods, such as liquid phase sintering. Liquid phase sintering may also be performed in combination with Sinter HIP. The sintering process may be performed in vacuum, in argon atmosphere or in nitrogen atmosphere or a combination thereof (see FIG. 2). FIG. 2 schematizes the main steps in a sintering cycle. These steps may vary depending on various factors, for the particular examples given in this disclosure segment A-B is the step initiating after the dewaxing period is finished and the temperature is raised up to the formation of melting of the sintered alloy (eutectic temp); segment B-C corresponds to the sintering step from the eutectic temperature to the maximum sintering temperature (T max) at liquid phase sintering; segment C-D is the isothermal sintering at the maximum sintering temperature (T max) and segment D-E is the cooling step from the maximum sintering temperature to a temperature far below the eutectic point of the sintered cemented carbide. The step wherein the material cools down until the process finishes is denoted "Furnace cooling".

According to the present disclosure, cemented carbides and/or cutting tools manufactured by using a method comprising the process as defined hereinabove or hereinafter, are coated with a wear resistant coating using CVD or PVD-technique. If a CVD-technique is used, then a CVD coating is deposited on said carbide and/or tool, the coating comprises at least one nitride or carbonitride layer, such as a TiCN layer or ZrCN layer or TiAlN layer but other nitride and/or carbonitride layers known to the skilled person may also be used as layers. Additionally, at least one α-Al₂O₃ or κ-Al₂O₃ layer may be applied on the cemented carbide and/or tool. An outermost color layer for wear detection, e.g. a TiN layer, may also be deposited.

The coating can also be subjected to additional treatments, such as brushing, blasting etc.

Hence, according to one embodiment, the process as defined hereinabove or hereinafter may be performed by first forming a slurry by milling the hard constituents which comprise hex doped WC with additions of carbides, nitrides and/or carbonitrides; such as TiC and/or TaC and/or TiN and/or Ti(C, N) together with binder metal, selected from Co, Ni, Fe, most preferred Co, organic binder, selected from PEG and a milling liquid (such as an alcohol and/or water) in either a ball mill or an attritor mill for several hours. The slurry is subjected to a spray drying operation to form granulated cemented carbide which will be used for pressing green parts that are subsequently sintered.

The cemented carbide is sintered in controlled atmosphere, including a step where the hex doped WC structure is subjected to nitrogen to trap more doping elements in the hex-WC and a step in a denitridation condition, i.e. under vacuum conditions, to produce a gradient in the near outersurface of the obtained cemented carbide.

The cemented carbide obtainable by the process as defined hereinabove or hereinafter may be used for any type of cutting tool such as wear parts, or other types of common applications for cemented carbides. Thus, the cemented carbides obtainable by the process as defined hereinabove or hereinafter comprise a hex doped WC phase in the sintered microstructure, wherein the doping elements are selected from the element groups 4, 5 and/or 7 (excluding Tc). Examples of doping elements are Ta, Nb, Ti, V, Cr and mixtures thereof.

The cemented carbides obtainable by the process as defined hereinabove and hereinafter may also be used for manufacturing products for other applications wherein cemented carbides are used, for example wear parts.

Figure 1B:
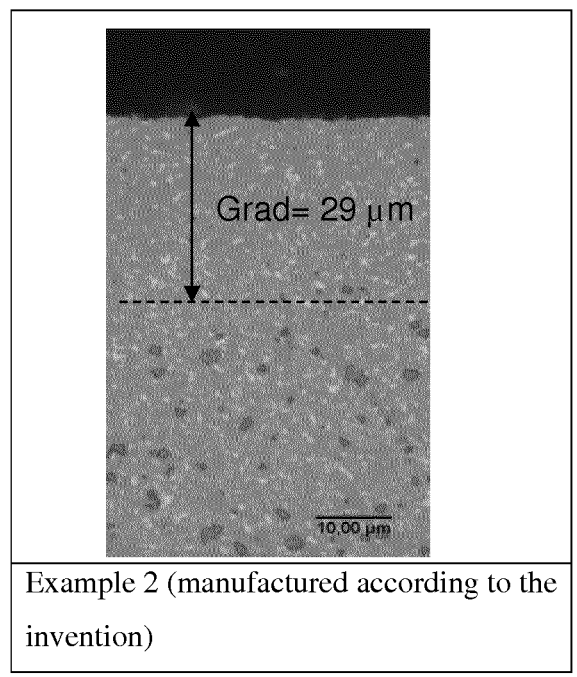
FIG. 1B discloses a cemented carbide obtained according to the process as defined hereinabove or hereinafter.
Figure 3:
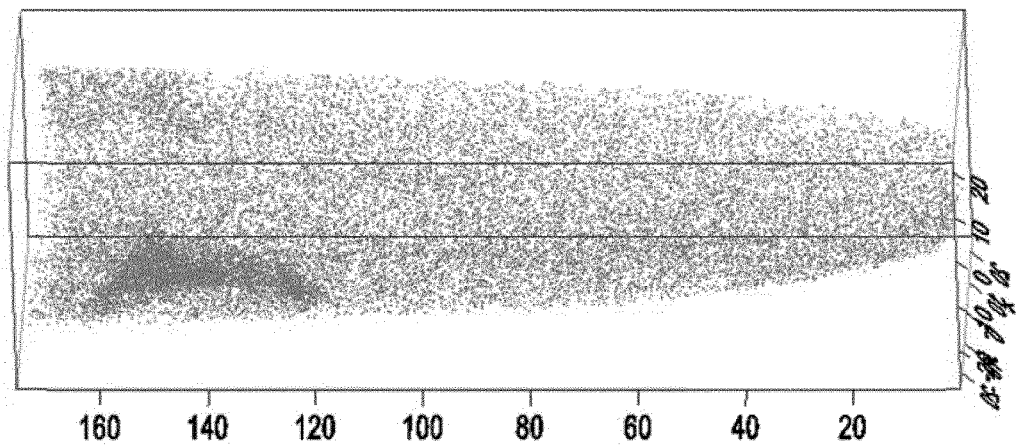
FIG. 3 discloses atom probe measurement of a hexagonal (W, Ta)C grain after sintering showing that the Ta remains as solid solution in the WC crystals.

FIG. 1B discloses a cemented carbide manufactuted according to the process as described hereinabove or hereinafter, as can be seen from the picture the cemented carbide has a gradient. Additionally, FIG. 3 discloses atom probe measurement of a hexagonal (W, Ta)C grain within a cemented carbide manufactured according to the process as described hereinabove or hereinafter. The measurement has been performed after sintering and it discloses that the Ta remains as solid solution in the WC crystals.

The process as defined hereinabove or hereinafter and the product obtained thereof are further illustrated by the following non-limiting examples:

EXAMPLES

Abbreviations

Co cobalt
TiN titanium nitride
WC tungsten carbide
PEG polyethylene glycol
wt % weight percent
Ti titanium
W tungsten
Ta tantalum
C carbon
N nitrogen
N₂ nitrogen gas
V vanadin
Cr chromium
μm micrometer
vol % volume percent
TaC tantalum carbide
HV hardness value
h or h. hours
° C. degrees Celsius
hex or hex. hexagonal
mbar millibar
CVD chemical vapor deposition
PVD plasma vapor deposition
Me transition metal Example 1 Comparative Example A composition comprising (in wt %) of 7.5 Co, 0.4 TiN, 2.7 TaC and balance WC and 2% PEG was mixed, granulated and pressed to produce a green body for sintering. The green body was sintered with the state-of-art process disclosed in U.S. Pat. No. 4,277,283 comprising a dewaxing step and a vacuum step at solid and liquid phase sintering at a temperature of 1450° C. in order to produce a gamma-phase depleted surface on the sintered cemented carbide.

The final microstructure of the sintered piece presented WC and a (Ti, W, Ta)(C, N) gamma-phase in the bulk and a near-surface zone depleted of gamma-phase (gradient) with a thickness of 19 μm. The volume fraction of gamma-phase in the bulk of the cemented carbide, determined by image analysis on sintered parts, was 3.6 vol %. The added TaC contributed to the formation of gamma-phase. The volume fraction was measured on scanning electron microscopy SEM images of the cross section of the sintered parts. Back-scattered electron SEM images with a magnification of 3000× were taken with an energy of 20 KV. The average of 10 rectangles (6.2 μm×125.86 μm) on each image was taken to determine the volume fraction. Image software analysis, LEICA QWIN was used. A SEM FEI instrument was used.

The average micro-hardness (HV0.01) in the gradient was 1860 HV and in the bulk of the cemented carbide was 1910 HV. The hardness was measured by Vickers indentation method. The results are an average of 10 indentations.

Example 2 Hex Doped WC Subjected to Nitrogen by the Addition of TiN Powder

A composition comprising (in wt %) 7.5 Co, 0.4 TiN, and balance hexagonal WC doped with 2.7 wt % TaC; and also comprising 2% PEG was mixed and milled for 18 h, granulated in a spray dryer and pressed to produce a green body for sintering.

The green body was sintered with a process comprising a dewaxing step to remove the PEG at temperatures below 450° C., a heating-up step was performed after the dewaxing step under controlled atmosphere conditions with a partial pressure of 50 mbars including a nitrogen gas with a heating rate of 1-10° C./min until the eutectic temperature of the alloy was reached, followed by a heating-up step with a heating rate of 1-10° C./min under vacuum until the maximum sintering temperature for "liquid phase sintering" was reached (1300-1600° C.), followed by a sintering step at liquid phase sintering conditions for 1 h under an atmosphere containing a gas (Ar/CO mixture (50:50)) of few mbars (1-100 mbar) and a cooling step from the maximum sintering temperature with a cooling rate of 1-10° C./min under a protective atmosphere of argon to a temperature of 900° C. followed by furnace cooling to 40° C.

The final microstructure of the sintered piece presented hex doped WC and (Ti, W, Ta)(C, N) gamma-phase in the bulk and a near-surface zone depleted of gamma-phase (gradient zone) with a thickness of 29 μm. This was measured on polished cross sections of sintered samples by using SEM (however light optical microscopy could have been used). A SEM FEI instrument was used.

The volume fraction of the gamma-phase determined by image analysis as described in Example 1 on sintered parts in the bulk of the cemented carbide was 2.7 vol %. Compared with Example 1, wherein the gradient was produced by a conventional method, using conventional raw powders, the volume fraction of gamma-phase differs in about 1 vol % (3.6 vol % vs 2.7 vol %). It is known that the solubility of Ta in the cobalt binder phase is very reduced (below 0.04 atom % in the solid for the system W—Ta—Co—C) [K. Frisk, Study of the Effect of Alloying Elements in Co-WC based Hardmetals by Phase Equilibrium Calculation, 17$^{th}$ Plansee Seminar 2009, Vol. 2 HM1/1], which indicates that the Ta-doping in the hex doped WC remained in solid solution in the hex WC after sintering and did not contribute to the formation of the gradient and gamma-phase in the bulk of the sintered piece.

The average micro-hardness (HV0.01) in the gradient was 1760 HV and in the bulk of the cemented carbide was 1830 HV. The hardness was measured by Vickers indentation method. The results are an average of 10 indentations.

Example 3 Nitrogen Added as $N_2$ Gas to Nitride Hex Doped WC+Controlled $N_2$ Atmosphere to Control Denitridation of Gamma Phase and Gradient Formation A composition comprising (in wt %) 7.5 Co, 0.9 TiC, 0.4 TiN, and balance hexagonal WC doped with 2.7 wt % TaC and 2% PEG was mixed, granulated and pressed to produce a green body for sintering.

The green body is sintered by using a process comprising a dewaxing step to remove the PEG at temperatures below 450° C., a heating-up step was performed after the dewaxing step under controlled atmosphere conditions including a nitrogen sintering partial pressure of 900 mbars with a heating rate of 1-10° C./min until the eutectic temperature of the alloy is reached, followed by a heating-up step with a heating rate of 1-10° C./min under vacuum until the maximum sintering temperature for "liquid phase sintering" is reached (1300-1600° C.), followed by a sintering step at liquid phase sintering conditions for 1 h under a controlled atmosphere of 10 mbar containing nitrogen and a cooling step from the maximum sintering temperature with a cooling rate of 1-10° C./min under a controlled atmosphere of 10 mbar containing nitrogen until a temperature of 900° C. followed by furnace cooling to 40° C.

The sintering step performed under nitrogen atmosphere aimed at nitriding the TiC, thus retarding the TiN decomposition and also nitriding the hex doped WC particles. The vacuum step aimed at denitriding the cemented carbide in order to produce a gamma-phase depleted surface on the sintered cemented carbide. The nitrogen atmosphere at high temperatures aimed at controlling the denitridation step and thus the thickness of the gamma-phase free gradient layer.

The final microstructure of the sintered piece provided hex Ta-doped WC and (Ti, W, Ta)(C, N) gamma-phase in the bulk and a near-surface zone depleted of gamma-phase (gradient zone) with a thickness of 46 μm. This is calculated as described in Example 2.

The volume fraction of gamma-phase in the bulk of the cemented carbide measured by using image analysis as described in Example 1 was 3.7 vol %. The theoretical volume fraction, assuming that all cubic carbides will form gamma phase, of gamma-phase for the starting formulation was 6.4 vol %; i.e. a difference in gamma-phase volume fraction of about 2.7 vol %; thus indicating that the Ta-doping in the hex-doped WC remained in solid solution in the hex WC after sintering and did not contribute to the formation of the gradient and gamma-phase in the bulk of the sintered piece.

The average micro-hardness (HV0.01) in the gradient was 1620 HV and in the bulk of the cemented carbide was 1850 HV. The hardness was measured by Vickers indentation method. The results are an average of 10 indentations.

Example 4 Nitrogen Added as $N_2$ Gas During Liquid Phase Sintering to Control Denitridation of Gamma Phase and Gradient Formation A composition comprising (in wt %) 7.5 Co, 0.9 TiC, 0.4 TiN and balance hexagonal WC doped with 2.7 wt % TaC and also comprising 2% PEG was mixed, granulated and pressed to produce a green body for sintering.

The green body was sintered with a process comprising a dewaxing step to remove the PEG at temperatures below 450° C., a heating-up step was performed to the green body after the dewaxing step under vacuum with a heating rate of 1-10° C./min until the eutectic temperature of the alloy was reached, followed by a heating-up step with a heating rate of 1-10° C./min under vacuum until the maximum sintering temperature for "liquid phase sintering" was reached (1300-1600° C.), followed by a sintering step at liquid phase sintering conditions for 1 h under controlled atmosphere conditions including a nitrogen sintering partial pressure of 15 mbars and a cooling step from the maximum sintering temperature with a cooling rate of 1-10° C./min under controlled atmosphere conditions including a nitrogen sintering partial pressure of 50 mbars until a temperature of 900° C. followed by furnace cooling to 40° C.

The sintering step under nitrogen atmosphere aimed at nitriding the TiC, thus retarding the TiN decomposition and also nitriding the hex doped WC particles. The vacuum step aimed at denitriding the cemented carbide in order to form a gamma-phase depleted surface on the sintered cemented carbide. The sintering step at controlled $N_2$ atmosphere of 15 mbars aimed at controlling the denitridation of the nitrided gamma-phase and hex doped WC and also aimed to control the gradient thickness formation.

The final microstructure of the sintered piece presents hex Ta-doped WC and (Ti, W, Ta)(C, N) gamma-phase in the bulk and a near-surface zone depleted of gamma-phase (gradient zone) with a thickness of 20 μm.

The volume fraction of gamma-phase in the bulk of the cemented carbide was 4.9 vol % and was determined as described in the Examples above. The theoretical volume fraction of gamma-phase for the starting formulation was 6.4 vol %.

From the difference in volume fractions, it can be observed that a certain content of TaC (ca. 1.5 wt %) remained in solid solution in the hex WC after sintering and did not contribute to the formation of the gradient and gamma-phase in the bulk of the sintered piece.

The average micro-hardness (HV0.01) in the gradient was 1700 HV and in the bulk of the cemented carbide was 1800

HV. The hardness was measured by Vickers indentation method. The results are an average of 10 indentations.

Example 5 Hexagonal WC Doped with Both Ta and Cr and Subjected to Nitrogen by the Addition of TiN Powder A composition comprising (in wt %) 7.5 Co, 0.9 TiC, 0.4 TiN and balance hexagonal WC doped with 0.39 wt % TaC and 0.3 wt % $Cr_3C_2$ also comprising 2% PEG was mixed, granulated and pressed to produce a green body for sintering.

The green body was sintered with a process comprising a dewaxing step to remove the PEG at temperatures below 450° C., a heating-up step was performed after the dewaxing step under controlled atmosphere conditions with a partial pressure of 50 mbars including a nitrogen gas with a heating rate of 1-10° C./min until the eutectic temperature of the alloy was reached, followed by a heating-up step with a heating rate of 1-10° C./min under vacuum until the maximum sintering temperature for "liquid phase sintering" was reached (1300-1600° C.), followed by a sintering step at liquid phase sintering conditions for 1 h under an atmosphere containing a gas Ar/CO mixture (50:50) of few mbars (1-100 mbar) and a cooling step from the maximum sintering temperature with a cooling rate of 1-10° C./min under a protective atmosphere of argon to a temperature of 900° C. followed by furnace cooling to 40° C.

The final microstructure of the sintered piece presented hex doped WC and (Ti, W, Ta)(C, N) gamma-phase in the bulk and a near-surface zone depleted of gamma-phase (gradient zone) with a thickness of 76 ρm. This was calculated as described in the Examples above.

The volume fraction of the gamma-phase determined by image analysis as described in th Examples above on sintered parts in the bulk of the cemented carbide was 4.0 vol %.

By doping WC with $Cr_3 C_2$ finer sintered WC particle size are achieved and hence higher hardness values. The average micro-hardness (HV0.01) in the gradient was 1900 HV and in the bulk of the cemented carbide was 2100 HV. The hardness was measured by Vickers indentation method. The results are an average of 10 indentations.

Hence, as can be seen from examples above and the tables below, using hex doped WC, a higher volume fraction of the hard phase in the composition may be needed in order to achieve the same hardness level as by using conventional WC. This implies a reduction of the volume fraction of binder phase, and hence equal toughness levels of hex doped WC cemented carbides compared to conventional WC cemented carbides, but with reduced binder metal content.

Additionally, the examples above and the tables below also show that the less total Ti, the less vol-fraction of gamma-phase and the less thickness of the gradient. Furthermore, it has also been shown that the nitridation/denitridation process for the formation of the gamma-phase free gradient layers can be controlled by selecting the type of sintering atmosphere. Addition of other doping elements to hexagonal WC such as $Cr_3 C_2$ has similar effects on gradient formation as for TaC and has also effect on WC particle size.

TABLE 1

| Example | Co (wt %) | TiN (wt %) | TiC (wt %) | TaC (wt %) | $Cr_3C_2$ (wt %) | WC |
|---|---|---|---|---|---|---|
| 1 | 7.5 | 0.4 | — | 2.7 | — | Std. WC05 |
| 2 | 7.5 | 0.4 | — | 2.7 | — | WC-doped TaC |
| 3 | 7.5 | 0.4 | 0.9 | 2.7 | — | WC-doped TaC |
| 4 | 7.5 | 0.4 | 0.9 | 2.7 | — | WC-doped TaC |
| 5 | 7.5 | 0.4 | 0.9 | 0.39 | 0.3 | WC-doped TaC + $Cr_3C_2$ |

TABLE 2

| Ex | Co | TiN | TiC | TaC | $Cr_3C_2$ | WC | Gt (μm) | Vol fr 1 (%) | Vol fr 2 (%) | Vol fr diff (%) |
|---|---|---|---|---|---|---|---|---|---|---|
| 1 SoA | 7.5 | 0.4 | — | 2.7 | — | StandardWC 05 | 19 | 3.6 | 3.6 | 0 |
| 2 Inv | 7.5 | 0.4 | — | 2.7 | — | WC-doped TaC | 29 | 2.7 | 3.6 | 1.1 |
| 3 Inv | 7.5 | 0.4 | 0.9 | 2.7 | — | WC-doped TaC | 46 | 3.5 | 6.4 | 2.9 |
| 4 Inv | 7.5 | 0.4 | 0.9 | 2.7 | — | WC-doped TaC | 20 | 4.9 | 6.4 | 1.5 |
| 5 Inv | 7.5 | 0.4 | 0.9 | 0.4 | 0.3 | WC-doped TaC + $Cr_3C_2$ | 76 | 4.0 | 4.3 | 0.3 |

Inv = invention
SoA = state of the art
Gt = gradient thickness
Vol fr1 = Vol fr gamma-phase measured
Vol fr2 = Vol fr gamma-phase (cubic carbides) by composition
The values of Co, TiN, TiC, TaC are all given in wt %.

The theoretical volume fraction of gamma-phase for the starting formulation was 4.3 vol %. From the difference in volume fractions, it can be observed that a certain content of TaC and $Cr_3C_2$ (ca. 0.3 wt %) remained in solid solution in the hex doped WC after sintering and did not contribute to the formation of the gradient and gamma-phase in the bulk of the sintered piece. The considerable larger thickness of the gradient can be correlated to the high affinity of Cr to N compared to Ta to N.

TABLE 3

| Example | A-B | B-C | C-D (LPS) | D-E | Heat/Cool rate |
|---|---|---|---|---|---|
| 1 | Vacuum | Vacuum | Protective Ar gas flow (5 l/min) | Protective Ar gas flow (5 l/min) | 1-10° C. |

TABLE 3-continued

| Example | A-B | B-C | C-D (LPS) | D-E | Heat/Cool rate |
|---|---|---|---|---|---|
| 2 | Gas mixture (Ar/CO) + $N_2$ gas (Pressure 50 mbar) | Vacuum | Protective Ar gas flow (5 l/min) | Protective Ar gas flow (5 l/min) | 1-10° C. |
| 3 | $N_2$ gas (P = 900 mbar) | Vacuum | Gas mixture Ar + $N_2$ + CO (15 mbar) | Gas mixture Ar + $N_2$ + CO (50 mbar) | 1-10° C. |
| 4 | Vacuum | Vacuum | Gas mixture Ar + $N_2$ + CO (15 mbar) | Gas mixture Ar + $N_2$ + CO (50 mbar) | 1-10° C. |

LPS—Liquid phase sintering

The invention claimed is:

1. A process of manufacturing a cemented carbide, said process comprising the steps of:
   a) forming a slurry including a milling liquid, binder metal and hard constituents, wherein said hard constituents include hex doped WC;
   b) subjecting said slurry to milling and drying to form a powder mixture; and
   c) subjecting the powder mixture to pressing and sintering, wherein the hex doped WC is subjected to nitrogen both by the addition of a transition metal nitride or transition metal carbonitride to said slurry and by subjecting the hex doped WC to nitrogen gas during sintering.

2. The process according to claim 1, wherein said transition metal nitride or transition metal carbonitride is selected from the element group 4, 5 and 6 and mixture thereof.

3. The process according to claim 2, wherein said transition metal or transition metal carbonitride is selected from the group of TiN, Ti(C,N), V(C,N), Zr (C,N), TaN, NbN, Ta(C,N) and mixtures thereof.

4. The process according to claim 1, wherein the sintering is performed under vacuum.

5. The process according to claim 1, wherein the doped WC is doped with a transition metal selected from the group of Ta, Ti, Nb, V, Cr and mixtures thereof.

6. The process according to claim 5, wherein said transition metal is Ta and/or Ti.

7. The process according to claim 1, wherein the binder metal is selected from the group consisting of Cr, Mo, Fe, Co and Ni.

8. The process according to claim 1, wherein said binder metal is Co.

9. The process according to claim 1, wherein said cemented carbide includes WC and hex doped WC in the range of from 65 to 90 wt %, Co in the range of from 3 to 15 wt %, Ta in the range of from 1 to 5 wt %, and Ti in the range of from 0.5 to 5 wt %.

10. A cemented carbide made according to the process of claim 1.

11. The cemented carbide according to claim 10, wherein the cemented carbide includes a surface and a gamma-phase free gradient layer disposed on the surface.

12. The cemented carbide according to claim 11, further comprising hex doped WC.

13. A cutting tool comprising a cemented carbide made according to the process of claim 1.

14. The cutting tool according to claim 13, wherein the cutting tool includes a surface and a gamma-phase free gradient layer disposed on the surface.

15. The cutting tool according to claim 14, wherein the gamma-phase free gradient layer and the cemented carbide include hex doped WC.

* * * * *